United States Patent [19]

Shaffer

[11] Patent Number: 5,052,984

[45] Date of Patent: Oct. 1, 1991

[54] ROLLER CHAIN WAVE GEAR DRIVE

[75] Inventor: James E. Shaffer, Maitland, Fla.

[73] Assignee: Consulier Industries, Inc., Riviera Beach, Fla.

[21] Appl. No.: 484,064

[22] Filed: Feb. 23, 1990

Related U.S. Application Data

[63] Continuation-in-part of Ser. No. 458,149, Dec. 28, 1989.

[51] Int. Cl.[5] .......... F16H 7/06

[52] U.S. Cl. .......... 474/156

[58] Field of Search .......... 474/155, 156, 157, 144–147; 74/63, 804

[56] References Cited

U.S. PATENT DOCUMENTS

| | | | |
|---|---|---|---|
| 3,468,175 | 9/1969 | Rabek | 74/63 |
| 3,507,159 | 4/1970 | Batty | 74/63 |
| 4,713,985 | 12/1987 | Ando | 74/804 |
| 4,736,654 | 4/1988 | Ren | 74/804 |
| 4,861,319 | 8/1989 | Kemp, Jr. | 474/156 X |

*Primary Examiner*—Thuy M. Bui
*Attorney, Agent, or Firm*—Warren L. Franz

[57] ABSTRACT

A drive mechanism has a cam with dual outwardly-facing elliptical cam surfaces axially-spaced across a gap and an arcuate wave gear segment with an inwardly-facing multi-toothed cam track annularly positioned in opposition to the gap. A chain has linked roller assemblies with first and third rollers that ride on the dual cam surfaces and second rollers of larger diameter that ride on the cam track and are held against axial displacement by travel in the gap. A differential exists over the same distance between the number of rollers and the number of teeth of the cam track. The cam surfaces drive the roller assemblies in a travelling wave along the cam track to drive the chain at a reduced speed around the cam. A drive winch assembly has link plates joining the roller assemblies on both sides of each roller to provide improved force distribution from one chain segment to the next.

15 Claims, 2 Drawing Sheets

ROLLER CHAIN WAVE GEAR DRIVE

CROSS-REFERENCE TO RELATED APPLICATIONS

This application is a continuation-in-part of commonly-owned, copending U.S. patent application Ser. No. 07/458,149, filed Dec. 28, 1989, entitled "Wave Gear Worm Drive " and includes subject matter related to the subject matter of commonly-owned, U.S. patent application Ser. Nos. 07/484,114 (entitled "Winch Apparatus") and 07/483,929 (entitled "Wave Gear Linear Drive"), filed on even date herewith. The disclosures of these applications are incorporated herein.

BACKGROUND OF THE INVENTION

This invention relates to chain drives in general; and, in particular, to a drive mechanism employing wave gear technology and an improved roller chain to provide a motion transfer speed reduction ratio between a chain and a drive gear about whose circumference the chain is wrapped.

Conventional roller chains and similar segmented linear members typically comprise pairs of laterally spaced, figure-eight shaped roller link plates joined in end-to-end articulated, linear configuration by means of laterally spaced pairs of similarly shaped pin link plates through which chain pins are extended at right angles at opposite ends of the roller link plate pairs. A cylindrical roller is disposed coaxially for rotation about each pin within the space between the roller link plates, and cotter pins or other means are used to keep the pins in position. Drive mechanisms employing such chains usually have a toothed sprocket about whose circumference the chain is wrapped and which drives the chain linearly in response to rotation of the sprocket. There is a 1:1 ratio between the number of teeth on a given arc length of the sprocket and the number of rollers (or spaces between rollers) on the same length of chain. Thus, motion between the sprocket and the chain is transferred in a 1:1 ratio between the tangential velocity of the sprocket and the lineal velocity of the chain.

Conventional wave gear drive mechanisms are illustrated in Rabek U.S. Pat. No. 3,468,175 and Batty U.S. Pat. No. 3,507,159. Such mechanisms produce a speed reduction between a drive and driven member due to cycling, elliptical wave motion induced by a cam surface on a plurality of roller elements placed in between and in simultaneous contact with the cam surface and an oppositely facing cyclically undulated surface formed by alternating teeth and pocket-shaped recesses and having greater or fewer teeth than the number of roller elements over the same arc length (typically one more or one less). As the cam surface is rotated, its major diameter causes each roller element in turn to be seated in the deepest part of a pocket of the opposing multi-toothed surface, thereby inducing a traveling wave-like radial reciprocation in the series of roller elements. Such reciprocation is used to either drive an annular member (wave gear) on which the opposing surface is located or drive an intermediate member which serves as a guide for the roller elements.

In a known concentric wave gear drive arrangement, shown in FIGS. 8 and 9 of Rabek, a cam drive member has two identical, outwardly-facing, circumferentially disposed cam surfaces axially spaced across a gap, and an inwardly-facing cyclically undulated, multi-toothed wave surface disposed annularly of the cam drive member in a position opposite the gap. Roller elements in the form of five laterally spaced, independently rotatable rollers coaxially mounted on common pins are confined in radially directed channels of an output member rotatable about a common axis with the drive member. The roller element pins are disposed in parallel with the axis of rotation of the drive and driven members, and the dimensioning of the rollers is such that the second and fourth rollers ride on the identical cam outwardly facing surfaces, while the central third rollers ride on the inwardly-facing multi-toothed surface. There is no disclosure in Rabek that the roller elements can be incorporated into a segmented linear array, nor that the driven member can take the form of a chain. There is also no disclosure that the rollers which ride on the dual outwardly-facing undulated surfaces can advantageously be of a different diameter than the roller which rides on the inwardly-facing undulated surface.

Batty, in FIGS. 17 and 18, shows a wave gear drive arrangement wherein a cam with an outwardly-facing cam surface is used to drive a continuous roller link chain having a plurality of articulated links connected together with rollers. The rollers are engaged between the cam surface and an inwardly-facing cyclically undulated wave gear surface of a fixed multi-toothed arcuate section annularly disposed directly opposite the cam. There is no disclosure in Batty of constructing a chain having a plurality of linked roller assemblies, each comprising multiple rollers freely independently rotatable about a common shaft pin, nor of utilizing axially-spaced undulated surfaces so that the different portions of the same roller assembly ride on different ones of the surfaces. There is, moreover, no teaching in either Rabek or Batty to utilize wave gear technology in combination with a roller link chain to provide a winch wherein a load-bearing linear member interacts directly with a rotated drum and the surrounding housing structure to bring about a direct motion transfer speed reduction ratio between the speed of the drum and the speed of the linear member wrapped around the drum.

SUMMARY OF THE INVENTION

It is an object of the present invention to provide a drive mechanism employing wave gear technology and an improved roller chain configuration to bring about motion transfer between a drive and a driven element at a non-unity speed transfer ratio.

It is a further object of the invention to provide an improved gear drive arrangement for transferring motion between oppositely-facing cyclically undulated cam surfaces and a continuous roller link chain having a plurality of articulated links connected together at longitudinally spaced intervals by means of roller assemblies having freely independently rotatable rollers, axially-spaced for rotation about common shafts.

It is a further object of the present invention to provide a winch having a load-carrying segmented linear member wrapped about a rotatable drum wherein a speed reduction ratio is brought about directly through interaction among the configuration of contacting surfaces of the drum, the linear member and the winch housing.

As described in greater detail below with reference to preferred embodiments thereof, a drive mechanism in accordance with the invention has movable and fixed oppositely-disposed, facing cyclically undulated cam or wave gear surfaces simultaneously contacted by a plurality of roller assemblies joined together and spaced at intervals by a plurality of articulated links forming a segmented chain. The roller assemblies comprise pluralities of rollers mounted for independent free rotation in axially-spaced positions about common shaft pins which serve as the pins holding together the chain links. The rollers are advantageously placed so that one roller contacts one of the undulated surfaces and another roller contacts the other of the undulated surfaces.

In a preferred configuration, the outwardly-facing undulated surface comprises dual outwardly-facing single- or multi-toothed cam surfaces, axially-spaced across a gap, and the inwardly facing surface comprises a multi-toothed cam track oppositely-disposed across from the gap. The roller assemblies comprise at least three rollers, outside ones of which are disposed to respectively ride on the dual cam surfaces, and a central one of which is disposed to ride on the cam track. The rollers may advantageously be of different diameters, so that lateral displacement of the chain in the direction of the pin axes is inhibited.

Additional link plates may be employed to join the pins at points between the rollers, to impart added load-carrying strength to the linkage. One embodiment utilizes the roller link chain of the invention in a winch apparatus, which utilizes wave gear mechanics to provide a motion transfer speed reduction directly at the connection between a load-supporting winch chain and a rotatable drum about which the chain is wound.

BRIEF DESCRIPTION OF THE DRAWINGS

Embodiments of the invention have been chosen for purposes of description and illustration, and are shown in the accompanying drawings, wherein.

Throughout the drawings, like elements are referred to by like numerals.

DESCRIPTION OF THE PREFERRED EMBODIMENTS

Figure 1:
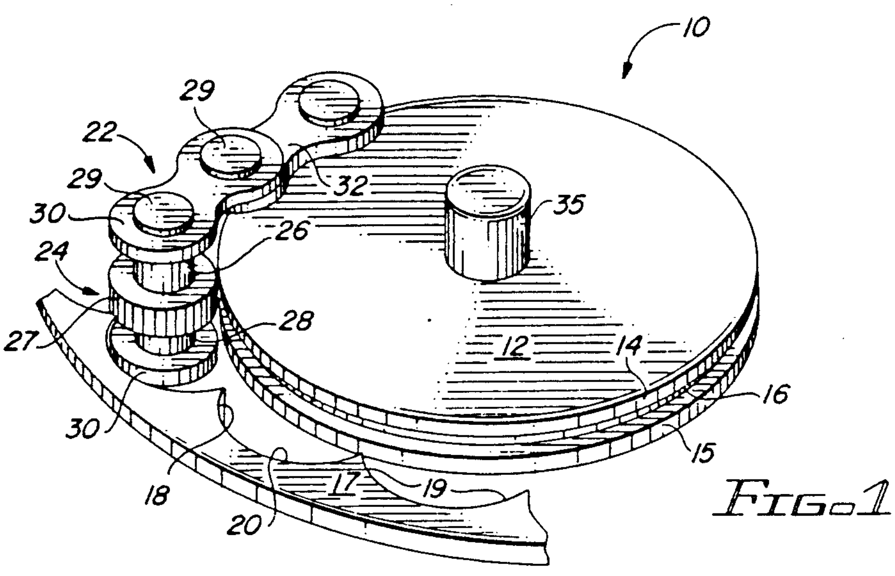
FIG. 1 is a schematic perspective view of a drive mechanism employing a continuous roller link chain in accordance with the invention.
Figure 2:
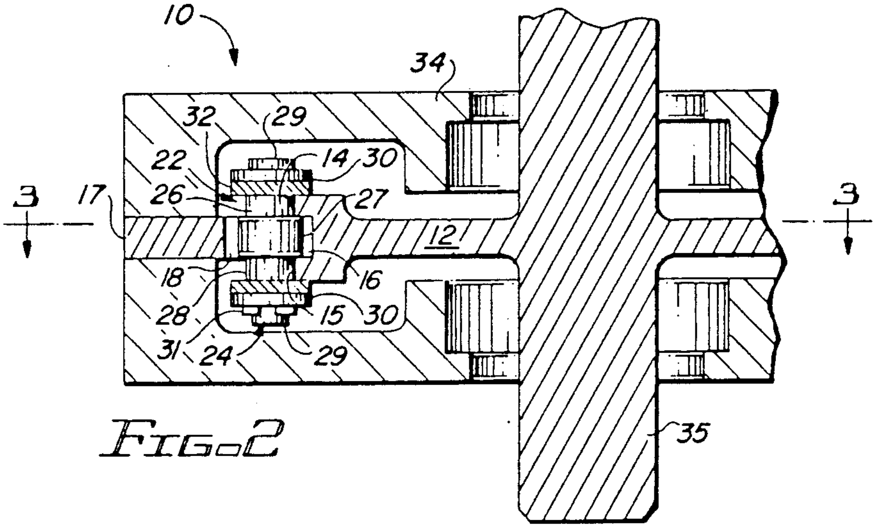
FIG. 2 is a fragmentary vertical central section of an implementation of the drive mechanism of FIG. 1, in a view taken along the line 2—2 of FIG. 3.
Figure 3:
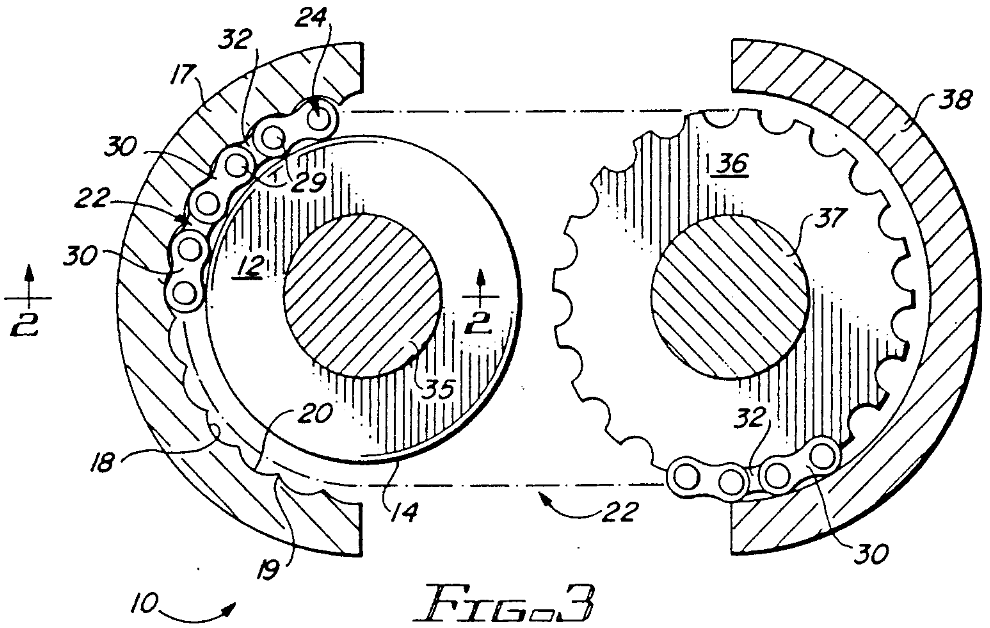
FIG. 3 is a horizontal central section of the drive mechanism of FIGS. 1-2, in a view taken along the line 3—3 of FIG. 2.

The principles of the invention are illustrated, by way of example, embodied in a drive mechanism 10 illustrated schematically in FIG. 1 and in more detail in FIGS. 2 and 3. The same principles are also illustrated, by way of further example, embodied in a winch assembly 110 described later with reference to FIGS. 4-6.

As shown in FIGS. 1-3, the drive mechanism 10 comprises a concentric wave gear arrangement including a drive member in the form of a cam 12 having dual outwardly-facing cam surfaces 14, 15 axially-spaced across a gap 16, and an arcuate member 17 annularly positioned at a distance circumferentially of the cam 12 and having an inwardly-facing multi-toothed cam track 18 disposed opposite the gap 16. The track 18 comprises a cyclically undulated surface having a multiplicity of evenly-spaced identical teeth 19 separated by alternating evenly-spaced identical rounded recesses or pockets 20.

A segmented linear member in the form of a continuous roller link chain 22 is wrapped around the cam 12, to extend circumferentially thereof between cam surfaces 14, 15 and cam track 18. In the embodiment of FIGS. 1-3, the chain 22 includes a plurality of roller assemblies 24 joined together and spaced at intervals by a plurality of articulated links. As seen in FIGS. 1 and 2, each assembly 24 comprises three rollers 26, 27, 28 mounted for independent free rotation in axially-spaced positions about a common shaft pin 29. Pairs of assemblies 24 are held in longitudinally spaced relationships by passage of the ends of respective pins 29 through opposing aligned apertures of pairs of laterally spaced, figure-eight shaped identical roller link plates 30. The pins 29 are held for rotation relative to the link plate 30 pairs by means such as cotter pins 31 (see FIG. 2). Longitudinally adjacent plates 30 are joined in articulated, longitudinally spaced fashion, in end-to-end relationship by parallel disposed pairs of laterally spaced, figure-eight shaped identical pin link plates 32. The chain 22 is configured so that the rotational axes of the pins 29 are parallel with each other and also with the respective arc axis of arcuate member 17 and rotational axis of cam 12. For the embodiment shown, the outside diameter surfaces of the rollers 26, 27, 28 are vertically straight, right cylindrical surfaces and the cam and cam track surfaces 14, 15, 18 are straight in their vertical directions. The lines of contact between the undulated surfaces and the rollers are, thus, likewise straight and vertical. It is to be understood, however, that those surfaces may have other configurations to provide non-vertical or non-straight lines of contact.

Although the cam 12, arc 17 and roller assembly 24 elements are shown somewhat exploded for clarity of depiction of the individual elements in FIG. 1, the chain 22 is wrapped around the cam 12 so that the outside rollers 26, 28 will be in contact with the cam surfaces 14, 15 and the central roller will be in simultaneous contact with the cam track 18 (see FIG. 2). The outside rollers 26, 28 are advantageously made of smaller outside diameter than the central roller 27, and the roller dimensions in their axial directions are chosen so that the roller 27 will be captured within the gap 16 and the rollers 26, 27, 28 will ride only on their respective intended riding cam or cam track surfaces. The arcuate member 17 is held fixed relative to the cam 12 and chain 22 by attachment of the member 17 to a stationary housing 34.

For the arrangement of FIGS. 1-3, the cam 12 can be rotated by means of a vertically extending input shaft 35 rotatably mounted on the housing 34. One portion of the continuous chain 22 is wrapped peripherally around one-half the perimeter of cam 12 to be in contact with both cam surfaces 14, 15 and also with the cam track 18 of a 180° arcuate wave gear segment 17. An oppositely located portion of the chain 22 is wrapped around one-half the circumference of a circular toothed sprocket 36 (FIG. 3), rotation of which will rotate a central output shaft 37. Another 180° arcuate segment 38, having a smooth internally-facing surface, is located annularly at a distance from the outer circumference of the sprocket 36 and functions as part of the housing to shield the chain 22 as the chain 22 travels about the sprocket 36.

The drive mechanism 10, thus described, provides a simple, compact, efficient, inexpensive and versatile configuration for transferring motion at a non-unitary speed transfer ratio between a drive member (cam 12) and a driven member (chain 22). The shown cam 12 has identical cam surfaces 14, 15 of generally elliptical shape, thereby giving outwardly-facing cyclically undulated surfaces of only two teeth or lobes. The cam surfaces 14, 15 could, however, if desired, be configured with a different number of uniformly spaced teeth.

The depicted mechanism 10 shows an arcuate member 17 having a cam track 18 of 11 teeth, evenly-spaced in an arcuate length corresponding to a length of chain 22 having 12 evenly-spaced roller assemblies 24. The number of teeth 19 (or pockets 20) and rollers assemblies 20 reacting therewith over the same arcuate distance can be varied, providing that a differential is maintained in accordance with principles of wave gear mechanics.

In operation, as the cam 12 is rotated by input shaft 35, the spaced cam surfaces 14, 15 drive the pluralities of outer rollers 26, 28 on the chain 22 in a cycling, elliptical wave. The major diameter of the cam 12 causes each roller 26, 28 to harmonically radially oscillate the respectively associated pins 29, thereby causing each central roller 27 in turn to be shifted between an innermost position at the maximum projection of a respective tooth 19 and an outermost position seated in the deepest part of a respective pocket 20. As the induced wave shape assumed by a line joining the axes of the roller assemblies 24 advances around the axis of rotation of the shaft 35, the chain 22 is caused to travel in a waveform motion through the wave gear segment presented by arcuate member 17. For each revolution of cam 12, chain 22 will advance in the direction of the turning cam for a lineal distance equal to the arcuate length between two teeth 19 (FIGS. 1 and 3). It is noted that if the ratio of teeth 19 to rollers 27 were 13:12, rather than the 11:12 shown, the direction of travel of the chain 22 would be the reverse; so the chain would retreat, not advance, two teeth 19 for each revolution of the cam 12. The advance (or retreat) of chain 22 will be communicated on a 1:1 basis at the sprocket 36 to rotate the output shaft 37 in the same direction that the chain 22 moves around the sprocket. The ratio between the angular velocities of input shaft 35 and output shaft 37 will, accordingly, generally be about 11:1 (or, for chain retreat, 13:1). An increase or decrease in the number of lobes of cam 12 or number of roller assemblies 24 and teeth 19 will result in corresponding changes in the ratio and/or direction.

Figure 4:
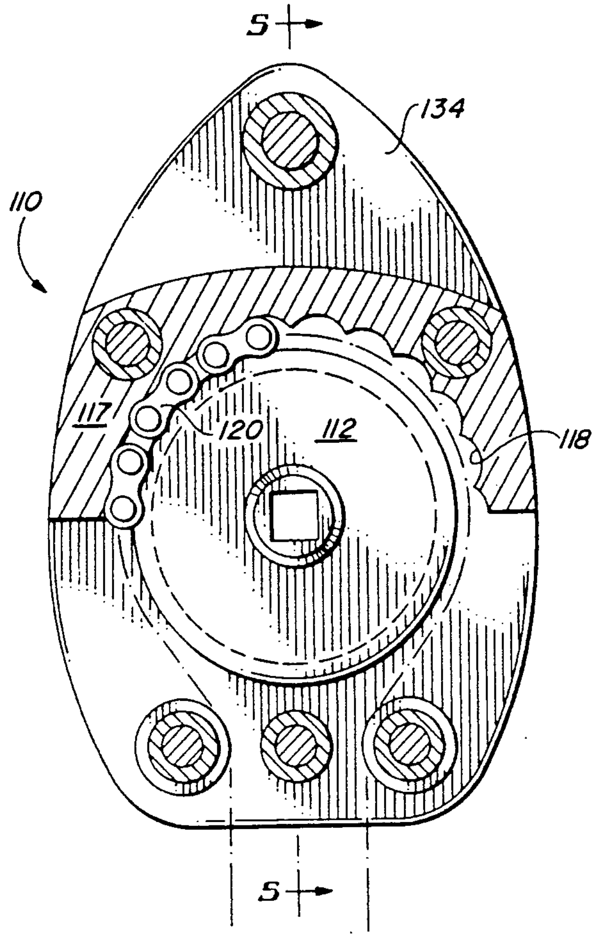
FIG. 4 is a vertical central section of a winch assembly incorporating the principles of the invention, in a front view taken along the line 4—4 of FIG. 5.
Figure 5:
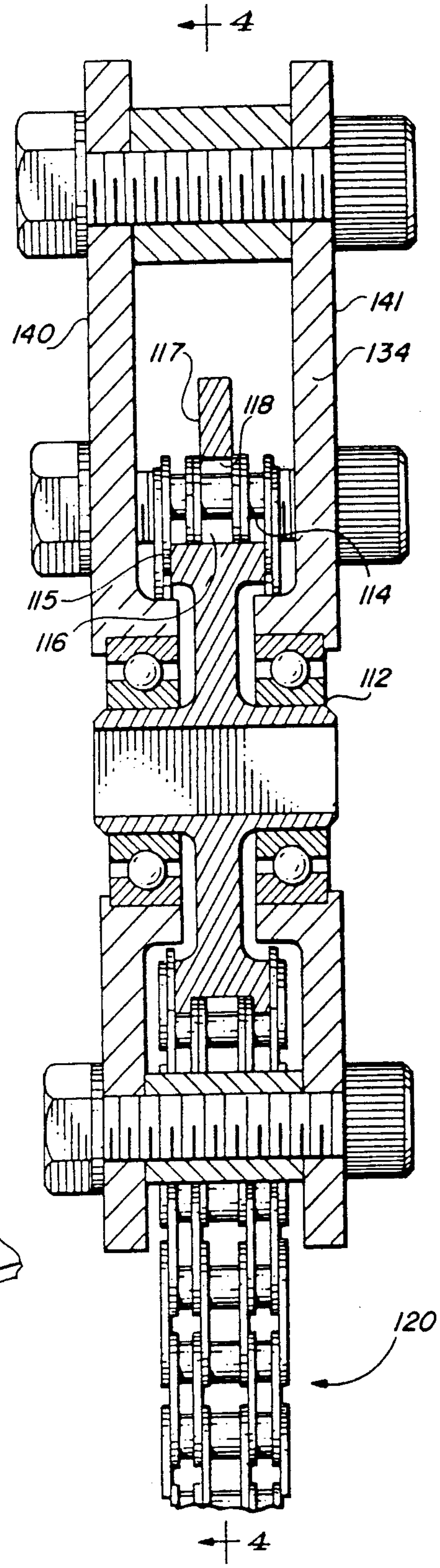
FIG. 5 is a vertical central section of the winch assembly of FIG. 4, in a side view taken along the line 5—5 of FIG. 4.
Figure 6:
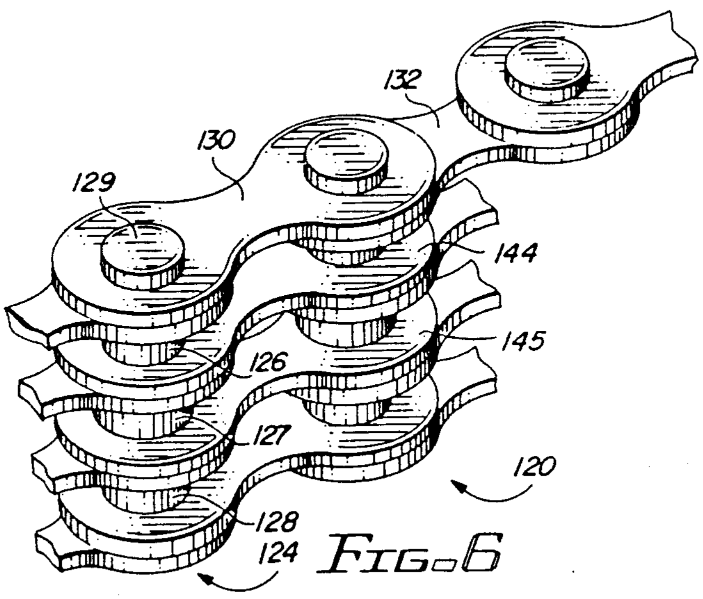
FIG. 6 is a fragmentary perspective view of a modified embodiment of a continuous roller link chain employed in the winch assembly of FIGS. 4 and 5.

FIGS. 4–6 illustrate another implementation of the invention wherein a winch assembly 110 has a load-supporting chain 120 driven by a cam shaped drum 112 which is mounted for rotation about a horizontal axis on a housing 134. The drum 112 has a plurality of outwardly-facing cyclically undulated surfaces 114, 115 axially spaced across a gap 116. An arcuate member 117 having an inwardly-facing cyclically undulated surface 112 is suitably mounted between left and right cheek plates 140, 141 opposite the gap 116.

The chain 120 (FIG. 6), like the chain 20, has roller assemblies 124 comprising three rollers 126, 127, 128 mounted in axially-spaced adjacent positions on a common shaft pin 129, with neighboring assemblies 124 being linked by link plates 130, 132. And, as with the drive mechanism 10 already described, the assemblies 124 of the chain 120 are configured so that outside rollers 126, 128 are of smaller diameter than the central roller 127, and central roller 127 projects into the gap 116. However, unlike chain 20, the chain 120 has additional roller link plates 144 and pin link plates 145 positioned to join the pins 129 at corresponding locations intermediate the rollers 126, 127 and the rollers 127, 128. The plates 144, 145 are adapted to ride adjacent the vertical edges of the gap 116 (FIG. 5). They function not only to inhibit axial displacement as the roller assemblies 24 travel around the drum 112, but also add to the strength and ruggedness of the chain 120 by linking the pins 129 to provide better force distribution between links along the chain 120. This feature is especially advantageous in winching operations. Because of the guiding action of the intermediate plates 144, 145 within the gap 116, the axial displacement inhibiting function of the larger diameter of roller 127 is not needed, so the rollers may be made the same diameter.

Separation of the rollers 126, 127, 128 by plates 144, 145 is also useful in cases where the outside rollers 126, 128 are caused to rotate (albeit independently) in a direction opposite to the rotation of the rollers 127 (viz. the chain 122 is configured relative to the member 117 and drum 112 to cause it to retreat). In such case, the interposition of the relatively non-movable planar surfaces of plates 144, 145 between the oppositely rotating adjacent surfaces of the rollers 126, 127, 128 will provide a more desirable relationship with the rollers from the standpoint of friction.

Those skilled in the art to which the invention relates will appreciate that other substitutions and modifications can be made to the described embodiments without departing from the spirit and scope of the invention as described by the claims below.

What is claimed is:

1. In combination with a first member having a cyclically undulated first surface, a second member having a cyclically undulated second surface oppositely disposed in facing relationship to said first surface, said first being movable in a drive direction relative to said second surface, a chain comprising:

a plurality of oppositely disposed pairs of link plates and a plurality of roller assemblies linking said pairs of link plates into a linear segmented unit; said roller assemblies comprising pins, and first and second rollers mounted in axially-spaced positions for independent free rotation about said pins, said first rollers being positioned to contact said first surface and said second rollers being positioned to simultaneously contact said second surface; and said rollers and surfaces being relatively dimensioned, configured and adapted so that, when said first surface is moved in said drive direction, said first surface will drive said pins by said first rollers in reciprocation to cause said second rollers to act against said second surface to drive said chain in a driven direction relative to both said first and second surfaces.

2. Apparatus as in claim 1, wherein said first member further comprises a cyclically undulated third surface laterally spaced from said first surface, and said roller assemblies further comprise third rollers mounted in axially-spaced positions relative to said first and second rollers for independent free rotation about said pins, said third rollers being positioned to contact said third surface.

3. Apparatus as in claim 2, wherein said first and third surfaces are laterally spaced across a gap, and said second rollers are located between said first and third rollers to travel in said gap.

4. Apparatus as in claim 1, wherein the diameters of said first and third rollers are less than the diameters of said second rollers.

5. Apparatus as in claim 2, wherein said chain further comprises a plurality of oppositely disposed second pairs of link plates and said plurality of roller assemblies link said second pairs of link plates at positions extending between said first and second rollers and between said second and third rollers respectively.

6. Apparatus as in claim 5, wherein said first and third surfaces are laterally spaced across a gap and said plurality of second pairs of link plates are located to travel in said gap.

7. A roller chain wave gear drive mechanism comprising:

a drive member in the form of a cam having dual outwardly-facing cam surfaces axially-spaced across a gap;

an arcuate member annularly positioned circumferentially of said cam and having an inwardly-facing cyclically undulated, multi-toothed cam track disposed opposite said gap; and a segmented linear member in the form of a roller link chain wrapped around said cam to extend circumferentially thereof between said cam surface and cam track;

said chain including a plurality of roller assemblies, and a plurality of pairs of laterally spaced link plates joining said roller assemblies together at spaced intervals in an articulated linked configuration;

said roller assemblies comprising pins joining respective ones of said pairs of link plates, and first, second and third rollers mounted for independent free rotation in axiallyspaced positions about said pins; said first and third rollers being positioned to contact respective ones of said dual cam surfaces, and said second rollers being positioned to simultaneously contact said cam track; and said rollers, cam surfaces and cam track being relatively dimensioned, configured and adapted so that when said cam is rotated, said cam surfaces will drive said pins by said first and third rollers in reciprocation radially of said cam, to cause said second rollers to act against said cam track to drive said chain linearly at a non-unity speed transfer ratio relative to said cam rotation.

8. A drive mechanism as in claim 7, wherein said second rollers are of a larger diameter than diameters of said first and third rollers, and said second rollers are dimensioned, configured and adapted to travel in said gap.

9. A drive mechanism as in claim 7, wherein said plurality of pairs of link plates join said roller assemblies together at corresponding positions outward of said rollers; and said chain further comprises a plurality of second pairs of laterally spaced link plates joining said roller assemblies together at corresponding positions respectively located between said first and second rollers, and between said second and third rollers.

10. In a winch assembly having a housing member, a drum rotatably mounted on said member, and a load-carrying chain wound about said drum, the improvement comprising:

said member including an inwardly-facing, cyclically undulated, multi-toothed wave surface;

said drum including an outwardly-facing cam surface disposed opposite to said wave surface;

said chain comprising a plurality of roller assemblies having pins and rollers rotatably mounted on said pins, and further comprising a plurality of link plates connecting said pins in articulated, longitudinally spaced linked relationship, and said chain being wound about said drum with said roller assemblies in simultaneous contact with both said wave and cam surfaces; and said member, drum and chain being relatively dimensioned, configured and adapted so that when said drum is driven in rotation, said roller assemblies will be driven in harmonic oscillation by said cam surface against said wave surface to cause said chain to travel around said drum at a non-unity velocity transfer ratio relative to said drum.

11. The improvement as in claim 10, wherein said roller assemblies comprise first and second rollers coaxially mounted in axially-spaced positions for independent free rotation about said pins, said first rollers are positioned to contact said cam surface and said second rollers are positioned to contact said wave surface.

12. The improvement as in claim 11, wherein said first and second rollers are of different diameters, and said cam surface is laterally spaced relative to said wave surface in correspondence to the axial spacing of said first and second rollers.

13. The improvement as in claim 11, wherein said cam surface is a first surface, said drum includes a second cam surface laterally spaced from said first cam surface, and said roller assemblies further comprise third rollers coaxially mounted in axially-spaced positions relative to said first and second rollers for independent free rotation about said pins, and said third rollers are positioned to contact said second surface.

14. The improvement as in claim 13, wherein said first and third rollers are of the same diameter, and said second roller is of a different diameter.

15. The improvement as in claim 14, wherein said first and second cam surfaces are spaced from each other across a gap, said second rollers are of a larger diameter than said first and third rollers, and said second rollers are located between said first and third rollers to travel in said gap.

* * * * *